United States Patent
Levy et al.

(10) Patent No.: US 11,917,042 B2
(45) Date of Patent: Feb. 27, 2024

(54) OPTIMIZING HEADER-BASED ACTION SELECTION

(71) Applicant: MELLANOX TECHNOLOGIES, LTD., Yokneam (IL)

(72) Inventors: Gil Levy, Hod Hasharon (IL); Aviv Kfir, Nili (IL); Pedro Reviriego, Madrid (ES); Salvatore Pontarelli, Rome (IT)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/402,545

(22) Filed: Aug. 15, 2021

(65) Prior Publication Data

US 2023/0050155 A1  Feb. 16, 2023

(51) Int. Cl.
*H04L 69/22* (2022.01)
*H04L 45/745* (2022.01)

(52) U.S. Cl.
CPC .................................. *H04L 69/22* (2013.01)

(58) Field of Classification Search
None
See application file for complete search history.

(56) References Cited

U.S. PATENT DOCUMENTS

| | | | |
|---|---|---|---|
| 5,537,514 A | 7/1996 | Nishidai | |
| 6,611,875 B1 | 8/2003 | Chopra et al. | |
| 6,957,215 B2 | 10/2005 | Stark | |
| 7,051,078 B1 | 5/2006 | Cheriton | |
| 7,054,315 B2 | 5/2006 | Liao | |
| 7,061,874 B2 | 6/2006 | Merugu et al. | |
| 7,116,663 B2 | 10/2006 | Liao | |
| 7,234,019 B1 | 6/2007 | Kao et al. | |
| 7,366,830 B1 | 4/2008 | Maheshwari | |
| 7,394,809 B2 | 7/2008 | Kumar et al. | |
| 7,426,518 B2 | 9/2008 | Venkatachary et al. | |
| 7,804,699 B2 | 9/2010 | Gupta et al. | |
| 7,904,642 B1 * | 3/2011 | Gupta | G06F 16/90339 |
| | | | 711/108 |
| 7,933,282 B1 | 4/2011 | Gupta et al. | |
| 8,271,564 B2 | 9/2012 | Dade et al. | |
| 8,290,934 B2 | 10/2012 | Stergiou et al. | |
| 8,305,271 B2 | 11/2012 | Li et al. | |
| 8,462,786 B2 | 6/2013 | Liu et al. | |
| 8,468,296 B1 | 6/2013 | Cohen | |
| 8,619,766 B2 | 12/2013 | Wang et al. | |

(Continued)

OTHER PUBLICATIONS

U.S. Appl. No. 17/013,697 Office Action dated Jan. 13, 2022.

(Continued)

*Primary Examiner* — Duc T Duong
(74) *Attorney, Agent, or Firm* — Kligler & Associates Patent Attorneys Ltd.

(57) ABSTRACT

A network element includes one or more ports and a packet processor. The one or more ports are to transmit and receive packets over a network. The packet processor is to apply a plurality of rules to the packets, each rule specifying (i) expected values for each header field of a group of header fields of the packets, including, for a given header field in the group, at least a set of multiple expected values, (ii) a group ID associated with the set, and (iii) an action to be applied to the packets whose header fields match the expected values.

12 Claims, 6 Drawing Sheets

(56) References Cited

U.S. PATENT DOCUMENTS

| | | | |
|---|---|---|---|
| 8,856,203 B1 | 10/2014 | Schelp et al. | |
| 8,861,347 B2 | 10/2014 | Bloch et al. | |
| 8,874,842 B1 | 10/2014 | Kimmel et al. | |
| 8,938,469 B1 | 1/2015 | Keen et al. | |
| 9,087,586 B2 | 7/2015 | Bosshart | |
| 9,098,601 B2 | 8/2015 | Wang | |
| 9,111,615 B1 | 8/2015 | Jiang | |
| 9,171,030 B1 | 10/2015 | Arad et al. | |
| 9,223,711 B2 | 12/2015 | Philip et al. | |
| 9,245,626 B2 | 1/2016 | Fingerhut et al. | |
| 9,262,312 B1 | 2/2016 | Gazit et al. | |
| 9,270,592 B1* | 2/2016 | Sites | H04L 45/745 |
| 9,317,517 B2 | 4/2016 | Attaluri et al. | |
| 9,344,366 B2 | 5/2016 | Bouchard et al. | |
| 9,406,381 B2 | 8/2016 | Akerib et al. | |
| 9,411,908 B2 | 8/2016 | Valency et al. | |
| 9,424,366 B1 | 8/2016 | Gazit et al. | |
| 9,438,505 B1 | 9/2016 | Zhou et al. | |
| 9,461,931 B1* | 10/2016 | Asveren | H04L 47/34 |
| 9,543,015 B1 | 1/2017 | Roy | |
| 9,569,561 B2 | 2/2017 | Wildman et al. | |
| 9,627,063 B2 | 4/2017 | Dharmapurikar | |
| 9,659,046 B2 | 5/2017 | Sen et al. | |
| 9,672,239 B1 | 6/2017 | Rottenstreich et al. | |
| 9,704,574 B1 | 7/2017 | Shamis | |
| 9,779,123 B2 | 10/2017 | Sen et al. | |
| 9,785,666 B2 | 10/2017 | Li et al. | |
| 9,866,479 B2 | 1/2018 | Wang et al. | |
| 9,892,057 B2 | 2/2018 | Levy et al. | |
| 9,984,144 B2 | 5/2018 | Levy et al. | |
| 10,049,126 B2 | 8/2018 | Levy et al. | |
| 10,068,034 B2 | 9/2018 | Levy et al. | |
| 10,097,378 B2 | 10/2018 | Dong et al. | |
| 10,313,231 B1* | 6/2019 | Bosshart | H04L 45/44 |
| 10,944,675 B1 | 3/2021 | Remen et al. | |
| 11,108,728 B1* | 8/2021 | Boutros | H04L 63/20 |
| 11,588,821 B1* | 2/2023 | Detwiler | H04L 63/0263 |
| 2002/0023080 A1* | 2/2002 | Uga | H04L 47/2408 |
| 2002/0089937 A1 | 7/2002 | Venkatachary et al. | |
| 2002/0154636 A1 | 10/2002 | Thomas | |
| 2003/0051165 A1 | 3/2003 | Krishnan et al. | |
| 2003/0123459 A1 | 7/2003 | Liao | |
| 2004/0100950 A1 | 5/2004 | Basu et al. | |
| 2005/0147113 A1 | 7/2005 | Brown | |
| 2006/0209725 A1 | 9/2006 | Cadambi et al. | |
| 2006/0271539 A1 | 11/2006 | Loeb | |
| 2008/0192754 A1 | 8/2008 | Ku et al. | |
| 2008/0215518 A1 | 9/2008 | Matsuda | |
| 2008/0228691 A1 | 9/2008 | Shavit et al. | |
| 2008/0259667 A1 | 10/2008 | Wickeraad | |
| 2009/0097654 A1 | 4/2009 | Blake | |
| 2010/0080223 A1 | 4/2010 | Wong et al. | |
| 2010/0269024 A1 | 10/2010 | Tao et al. | |
| 2012/0054467 A1 | 3/2012 | Fulton et al. | |
| 2012/0137060 A1 | 5/2012 | Akerib et al. | |
| 2012/0275466 A1 | 11/2012 | Bhadra et al. | |
| 2013/0311492 A1 | 11/2013 | Calvignac et al. | |
| 2014/0006706 A1 | 1/2014 | Wang | |
| 2014/0089498 A1 | 3/2014 | Goldfarb et al. | |
| 2014/0201307 A1 | 7/2014 | Banavalikar et al. | |
| 2014/0215144 A1 | 7/2014 | Valency et al. | |
| 2014/0310307 A1 | 10/2014 | Levy et al. | |
| 2015/0039823 A1 | 2/2015 | Chen | |
| 2015/0058595 A1 | 2/2015 | Gura et al. | |
| 2015/0117450 A1* | 4/2015 | Thibaut | H04L 45/48 370/392 |
| 2015/0127900 A1 | 5/2015 | Dharmapurikar et al. | |
| 2015/0207735 A1 | 7/2015 | Kuramoto | |
| 2015/0242429 A1 | 8/2015 | Varvello et al. | |
| 2015/0244842 A1 | 8/2015 | Laufer et al. | |
| 2016/0202932 A1 | 7/2016 | Kadu | |
| 2016/0294625 A1 | 10/2016 | Mahkonen et al. | |
| 2016/0315880 A1* | 10/2016 | Guo | H04L 49/3009 |
| 2016/0350358 A1 | 12/2016 | Patel et al. | |
| 2017/0046395 A1 | 2/2017 | Li et al. | |
| 2017/0053012 A1 | 2/2017 | Levy et al. | |
| 2017/0147254 A1 | 5/2017 | Adams et al. | |
| 2017/0195253 A1 | 7/2017 | Annaluru et al. | |
| 2017/0324663 A1* | 11/2017 | Menase | H04L 45/7453 |
| 2017/0346765 A1 | 11/2017 | Immidi | |
| 2018/0011852 A1 | 1/2018 | Bennett et al. | |
| 2018/0262599 A1* | 9/2018 | Firestone | H04L 49/70 |
| 2018/0278525 A1 | 9/2018 | Levy et al. | |
| 2018/0330412 A1 | 11/2018 | Fredriksson et al. | |
| 2019/0036821 A1 | 1/2019 | Levy et al. | |
| 2019/0042304 A1 | 2/2019 | Wang et al. | |
| 2019/0149516 A1* | 5/2019 | Rajahalme | H04L 63/0254 370/392 |
| 2019/0340028 A1* | 11/2019 | Fujiwara | G06F 9/5022 |
| 2020/0042629 A1 | 2/2020 | Levy et al. | |
| 2020/0089816 A1 | 3/2020 | Shattah | |
| 2020/0228449 A1* | 7/2020 | Shmilovici Leib | H04L 45/7453 |
| 2021/0297151 A1* | 9/2021 | Levi | H04L 49/351 |

OTHER PUBLICATIONS

U.S. Appl. No. 16/865,560 Office Action dated Feb. 8, 2022.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Pagh, R., "Cuckoo Hashing for Undergraduates", IT University of Copenhagen, pp. 1-6, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", pp. 1-6, year 2000 http://www.partow.net/programming/hashfunctions/.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsruhe, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, pp. 1-37, May 21, 2004.

Demetriades et al., "An Efficient Hardware-basedMulti-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Kasnavi et al., "A cache-based internet protocol address lookup architecture", Computer Networks, vol. 52, pp. 303-326, year 2008.

Matousek, et al., "ClassBench-ng: Recasting ClassBench After a Decade of Network Evolution", Proceedings of the Symposium on Architectures for Networking and Communications Systems (ANCS '17), pp. 1-13, May 2017.

U.S. Appl. No. 16/865,560 Office Action dated May 23, 2022.
U.S. Appl. No. 17/013,697 Office Action dated Jul. 12, 2022.

(56) References Cited

OTHER PUBLICATIONS

U.S. Appl. No. 16/865,560 Office Action dated Oct. 14, 2021.
U.S. Appl. No. 16/865,560 Advisory Action dated Dec. 7, 2021.
U.S. Appl. No. 17/013,697 Office Action dated Dec. 14, 2022.
U.S. Appl. No. 17/013,697 Office Action dated Apr. 3, 2023.
Breslow et al., "Horton Tables: Fast Hash Tables for In-Memory Data-Intensive Computing," Proceedings of the 2016 USENIX Annual Technical Conference, pp. 281-294, Jun. 2016.
Hua et al., "Variable-Stride Multi-Pattern Matching For Scalable Deep Packet Inspection", IEEE Infocom , pp. 415-423, Rio de Janeiro, Brazil, Apr. 19-25, 2009.
Che et al., "DRES: Dynamic Range Encoding Scheme for TCAM Coprocessors", IEEE Transactions on Computers, vol. 57, No. 7, pp. 902-915, Jul. 2008.
Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.
Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.
Liu et al., "Complete Redundancy Removal for Packet Classifiers in TCAMs", IEEE Transactions on Parallel and Distributed Systems, vol. 21, No. 4, pp. 424-437, Apr. 2010.
Taylor et al., "Scalable Packet Classification using Distributed Crossproducting of Field Labels", IEEE Infocom, pp. 1-12, 2005.
Mittelman, U.S. Appl. No. 16/865,560, filed May 4, 2020.
Xu et al., "A Novel Hash-based Packet Classification Algorithm," 5th International Conference on Information Communications & Signal Processing, pp. 1504-1508, Dec. 2005.
Pontarelli et al., "Parallel d-Pipeline: A Cuckoo Hashing Implementation for Increased Throughput", IEEE Transactions on Computers, vol. 65, No. 1, pp. 326-331, Jan. 2016.
Reviriego et al., "Energy Efficient Exact Matching for Flow Identification with Cuckoo Affinity Hashing", IEEE Communications Letters, vol. 18, No. 5, pp. 885-888, May 2014.
Pontarelli et al., "Cuckoo Cache: A Technique to Improve Flow Monitoring Throughput", IEEE Internet Computing, vol. 20, issue 4, pp. 1-11, Jul.-Aug. 2016.
Zhou et al., "Scalable, High Performance Ethernet Forwarding with CUCKOOSWITCH", CoNEXT '13, pp. 1-12, Santa Barbara, USA, Dec. 9-12, 2013.
Bi et al., "Hierarchical trie packet classification algorithm based on expectation-maximization clustering," research article, PLOS One, pp. 1-12, Jul. 13, 2017, as downloaded from https://journals.plos.org/plosone/article?id=10.1371/journal.pone.0181049.
Baboescu et al., "Scalable Packet Classification," IEEE/ACM Transactions on Networking, vol. 13, No. 1, pp. 2-14, Feb. 2005.
Kogan et al., "Strategies for Mitigating TCAM Space Bottlenecks," IEEE 22nd Annual Symposium on High-Performance Interconnects, IEEE Computer Society, pp. 25-32, year 2014.
U.S. Appl. No. 16/865,560 Office Action dated Jun. 24, 2021.
Levy et al., U.S. Appl. No. 17/013,697, filed Sep. 7, 2020.
U.S. Appl. No. 16/052,646 Office Action dated Sep. 17, 2021.
U.S. Appl. No. 17/678,074 Office Action dated Aug. 3, 2023.
U.S. Appl. No. 17/679,160 Office Action dated Dec. 7, 2023.

\* cited by examiner

FIG. 1

| Rule Number | Source IP | Source Port | Protocol | Destination IP | Destination Port | Action |
|---|---|---|---|---|---|---|
| R1 | X.X.X.X | X | TCP | 138.100.17.10 | 80 | Allow |
| R2 | X.X.X.X | X | TCP | 138.100.17.10 | 443 | Allow |
| R3 | X.X.X.X | X | TCP | 138.100.17.10 | 8080 | Allow |
| R4 | 138.90.10/24 | X | TCP | 138.100.17.23 | 20 | Allow |
| R5 | 138.90.10/24 | X | TCP | 138.100.17.23 | 21 | Allow |
| R6 | X.X.X.X | X | UDP | 138.100.17.44 | 514 | Allow |
| R7 | X.X.X.X | X | X | X.X.X.X | X | Deny |

OPTIMIZING HEADER-BASED ACTION SELECTION

FIELD OF THE INVENTION

The present invention relates generally to communication networks, and particularly to efficient determination of communication packet actions based on the packet header.

BACKGROUND OF THE INVENTION

In communication networks, actions may be applied to communication packets according to the contents of one or more header fields of the packets.

In "Hierarchical trie packet classification algorithm based on expectation-maximization clustering", by Bi and Zhao (Jul. 13, 2017; doi.org/10.1371/journal.pone. 0181049), the authors assert that packet classification algorithms which are able to deal with large-scale rule sets are in urgent need, and explain that packet classification algorithms based on a hierarchical trie have become important because of their widely practical use, despite the shortcomings of the hierarchical trie such as the existence of backtracking and empty nodes. The authors next propose a new packet classification algorithm based on Expectation-Maximization Clustering (HTEMC) that not only adopts trie path compression to eliminate backtracking, but also is said to solve the problem of low efficiency of trie updates, which greatly improves the performance of the algorithm.

In "Scalable Packet Classification", by Barboescu and Varghese (IEEE/ACM Transactions on Networking, vol. 13, no. 1, February 2005), the authors assert that packet classification reported in the literature scales poorly in either time or space as filter databases grow in size, while hardware solutions such as TCAMs do not scale to large classifiers. The paper seeks to exploit this observation to produce a scalable packet classification scheme called Aggregated Bit Vector (ABV), which takes the bit vector search algorithm (BV) (which takes linear time) and adds two new ideas—recursive aggregation of bit maps and filter rearrangement—to an ABV that can take logarithmic time for many databases.

Lastly, techniques to increase the efficiency of TCAMs in packet classification are described, for example, in "Algorithms for Advanced Packet Classification with Ternary CAMs," by Lakshminarayanan et al. (ACM SIGCOMM 2005).

SUMMARY OF THE INVENTION

An embodiment of the present invention that is described herein provides a network element including one or more ports and a packet processor. The one or more ports are to transmit and receive packets over a network. The packet processor is to apply a plurality of rules to the packets, each rule specifying (i) expected values for each header field of a group of header fields of the packets, including, for a given header field in the group, at least a set of multiple expected values, (ii) a group ID associated with the set, and (iii) an action to be applied to the packets whose header fields match the expected values.

In some embodiments, the expected values of the header fields include a "do-not-care" indication. In some embodiments, the expected values for the given header field include a "do-not-care" indication.

In an embodiment, the packet processor includes a Ternary Content-Addressable Memory (TCAM) to store the rules, including the group ID. In another embodiment, the packet processor comprises a Random-Access Memory (RAM) and ancillary logic to store the rules, including the group ID. In a disclosed embodiment, the given header field specifies a destination port. In an example embodiment, the given header field specifies a source port.

There is additionally provided, in accordance with an embodiment of the present invention, a method including transmitting and receiving packets over a network by a network element. A plurality of rules is applied to the packets in the network element, each rule specifying (i) expected values for each header field of a group of header fields of the packets, including, for a given header field in the group, at least a set of multiple expected values, (ii) a group ID associated with the set, and (iii) an action to be applied to the packets whose header fields match the expected values.

The present invention will be more fully understood from the following detailed description of the embodiments thereof, taken together with the drawings in which:

DETAILED DESCRIPTION OF EMBODIMENTS

Overview

Network elements, such as network switches and routers, receive packets from ingress ports and forward the packets to egress ports, according to forwarding, routing and security rules. The network element typically comprises ingress and egress ports that communicate packets over a communication network (e.g., Ethernet or InfiniBand™), and a packet processor, which processes and routes the packets according to a set of rules that are typically based on values in certain fields of the packet headers. (In a TCP/IP packet, for example, the header fields include the source address, L4 source port, protocol, destination address and L4 destination port. These header fields are collectively known as an L4 5-tuple.)

The set of rules, (which is sometimes called an Action Table or a Match-Action-Table) comprises a plurality of actions, and, for each action, the corresponding values of the header fields of the packet upon which the action should be applied. Typically, the values of the packet header fields specified for each rule comprise "don't care" fields; for example, if a given action should be applied to all packets having a given ingress port value, irrespectively of the values of the other header fields, the corresponding rule will comprise the given ingress port value of the ingress port header field, and "don't care" for all other header fields.

In practice, there may be multiple rules that specify the same action and differ by the value of a single header field. For example, in some cases, the same action should be taken for packets that have a given set of values in four of the header fields if the value of the fifth header field is one of a group of 50 preset values. In this case, the number of required rules will be 50. In some cases, there may be two or more groups of preset values of the same header field that point to the same action; and, in other cases, a second given set of values in the four header fields, combined with the same (or with a different) group of values of the fifth header field, will point to the same action.

The scenario described above may result in a huge number of rules, which may slow the packet processing and/or require a large amount of circuitry, including a large amount of memory. When the rule matching is done using a Ternary Content-Addressable Memory (TCAM), the TCAM size may be very large and/or not all rules may fit in the TCAM. (TCAM has the advantage of concurrently searching for all rules, and the disadvantage of large area and high power-consumption.)

Embodiments of the present invention that are disclosed herein provide an apparatus and methods that efficiently locate a rule based on the values of the packet header fields. In an embodiment, the values of one or more of the header fields are first sorted into groups, wherein each of the group is assigned a unique ID; and a new field, which specifies expected values of the group ID, is added to the headers. In some embodiments, when a TCAM is used for rule matching, the TCAM uses an additional search field in which the value of the group ID is specified. Thus, in the present embodiments, the number of rules may be substantially reduced, decreasing the size and/or increasing the speed of the rule matching.

System Description

Figure 1:
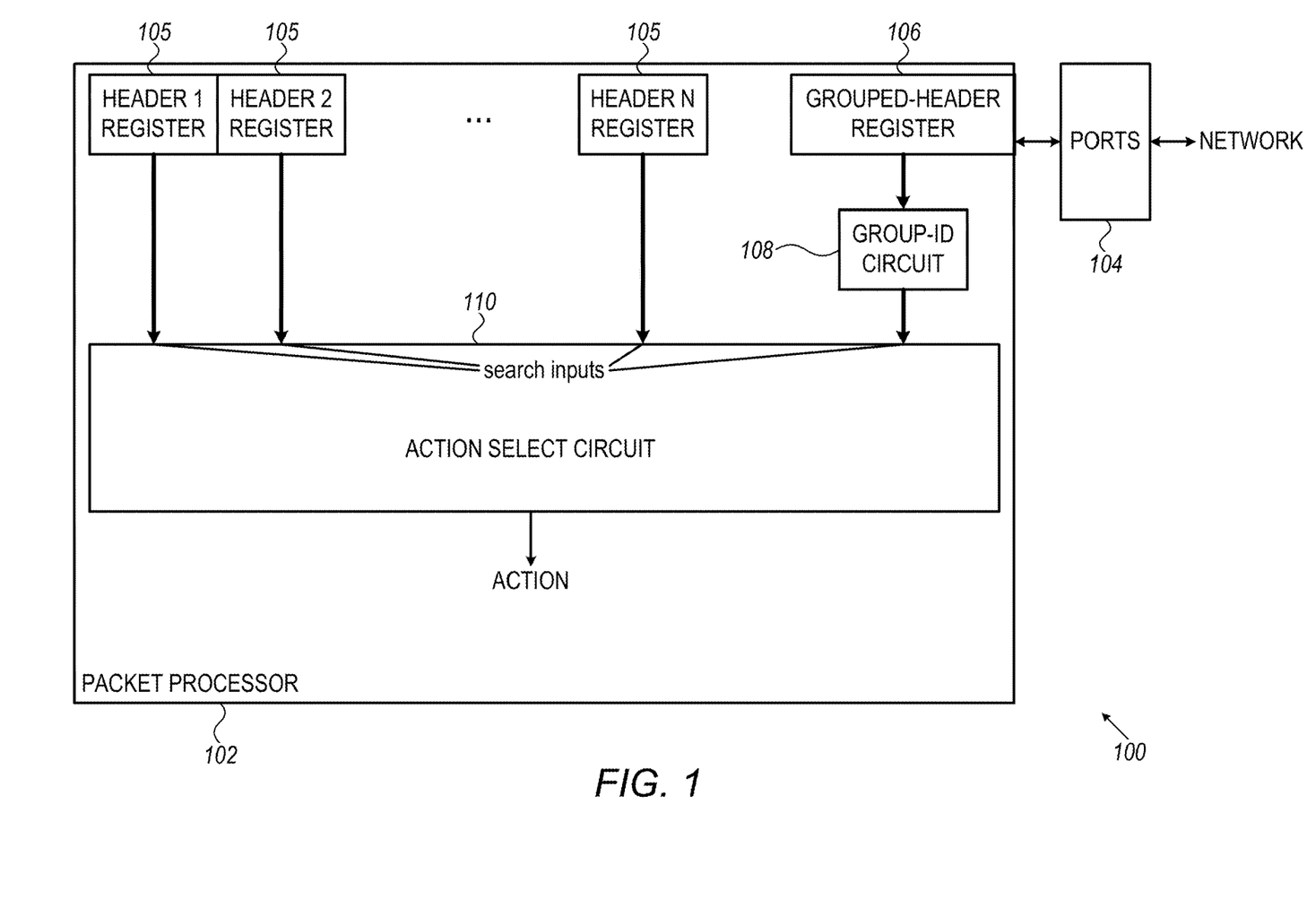
FIG. 1 is a block diagram that schematically illustrates a network element, in accordance with an embodiment of the present invention.

FIG. 1 is a block diagram that schematically illustrates a network element 100, in accordance with an embodiment of the present invention. Network element 100 may be a switch, such as a bridge or router, for example, or a network interface controller (NIC). The network element comprises a packet processor 102, which exchanges packets with a network through ports 104 (which typically serve as both ingress and egress ports). Ports 104 typically comprise physical layer (PHY) and media access control (MAC) interface circuits, as are known in the art. Packet processor 102 comprises digital logic and memory circuits, as will be described below in greater detail. Other components of network element 100 are omitted for the sake of simplicity.

Packet processor 102 receives ingress packets from the network through ports 104; the packets typically comprise a packet header and a packet body. The packet header comprises header fields, for example including a source address, a source L4 port, a protocol, a destination address, and a destination L4 port. Packet processor 102 extracts the packet headers from each packet and stores the headers in header registers 105. According to the example embodiment illustrated in FIG. 1, one of the header fields is a grouped header, which is stored in a grouped-header register 106. A grouped header is a packet header fields for which groups of values are defined; for example, the grouped header may be the L4 destination port header, wherein a first (ID=1) group of values {50,72,1947}, a second (ID=2) group of values {80,443,8020} and a third (ID=3) group of values {1,11,19, 99} are defined.

Packet processor 102 further comprises a group-ID circuit 108, which compares the value of the grouped header with the defined groups of values, and outputs the preset ID of the group for which the value matches. For example, with the three example groups defined above, the group-ID table will indicate ID=2 for a grouped-header value of 443, and ID=3 for a grouped-header-value of 99. In some embodiments some of the groups may overlap, and, hence, more than one ID may be indicated for the same grouped header.

Packet processor 102 further comprises an Action Select Circuit (ASC) 110, which selects an action to be applied to the packet according to search inputs of the ASC. In an embodiment, ASC 110 comprises a TCAM. Alternatively or additionally, ASC 110 may comprise other types of memory together with suitable logic circuits. The outputs of header registers 105 and of group-ID circuit 108 are coupled to the search inputs of ASC 110, which store a set of rules. Each rule comprises expected values (including "don't-care" fields and individual "don't-care" bits within fields) for the headers and for the group IDs, and a specified action to be applied to packets whose headers match the expected values.

Some rules may specify the same action but have different header field values that belong to the same group. According to the embodiment illustrated in FIG. 1, such rules may be consolidated into a single rule, with the corresponding group ID. Thus, the size of the rule table may shrink considerably.

Packet processor 102 may comprise additional components, most notably one or more processors; for the sake of simplicity, however, such components are not shown in FIG. 1.

The structure of network element 100 and packet processor 102 illustrated in FIG. 1 and described hereinabove are examples that are cited for the sake of conceptual clarity. Other structures may be used in alternative embodiments. For example, in some embodiments, the grouped header is also registered in one of header registers 105. In another embodiment, more than one grouped header fields may be used, and, in some embodiments, grouped-header register 106 may comprise groups of values of an aggregation of two or more headers.

Reference is now made to FIGS. 2 through 5B, which illustrate an example of a ruleset with grouping of one of the header fields, in accordance with an embodiment of the invention. The example shows the updated ruleset that is obtained when header grouping is applied and the application of the updated ruleset to a sequence of ingress packets. In the present example, the grouped header field is the destination L4 port. Other header fields may be grouped in alternative embodiments, including, for example, the source L4 port header field or any other suitable header field.

Figure 2:
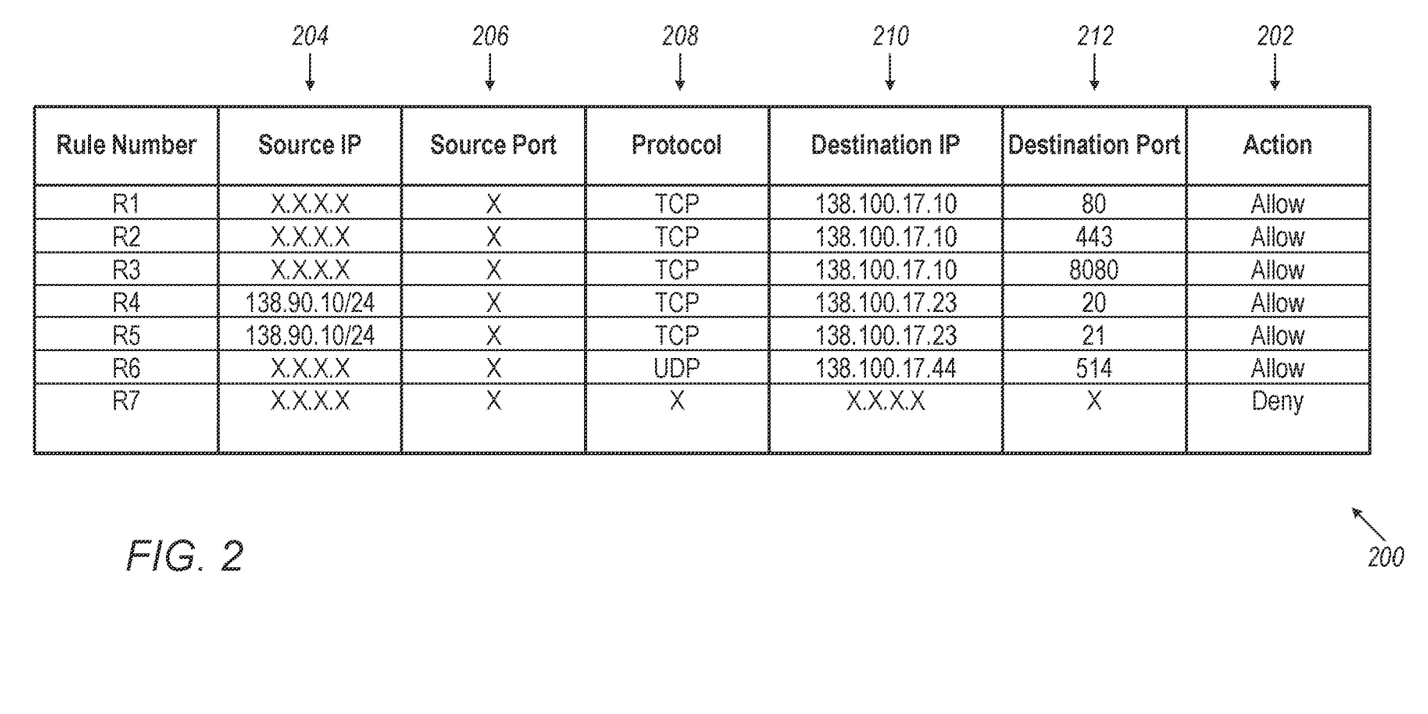
FIG. 2 is a table that schematically illustrates a ruleset, in accordance with an embodiment of the present invention.

FIG. 2 is a table that schematically illustrates a ruleset 200, in accordance with an embodiment of the present invention. No grouped header field is used, and the table defines an action 202 by comparing a source IP header field with source-IP rules 204, a source L4 port header field with source-port rules 206, a protocol header field with protocol rules 208, a destination IP header field with destination-IP rules 210, and a destination L4 port header field with destination port rules 212. Each rule is represented by a row in table 200, including, for each header field, an expected value for the corresponding rule and a corresponding action 202. Although the actions in the example embodiment illustrated in FIG. 2 can be either "Allow" or "Deny", other types of actions may be used in alternative embodiments. Furthermore, although table 200 is short for the sake of simplicity of illustrations, in practical embodiments the size of the rule table is much larger.

The rules in table 200 are designated R1 through R7. As can be observed, rules R1, R2 and R3 differ only in the destination L4 port value, which can be any member of the group {80,443,8080}. Likewise, rules R4 and R5 share the same values of all header fields except the destination L4 port, which may be any member of the group {20,21}.

Figure 3:
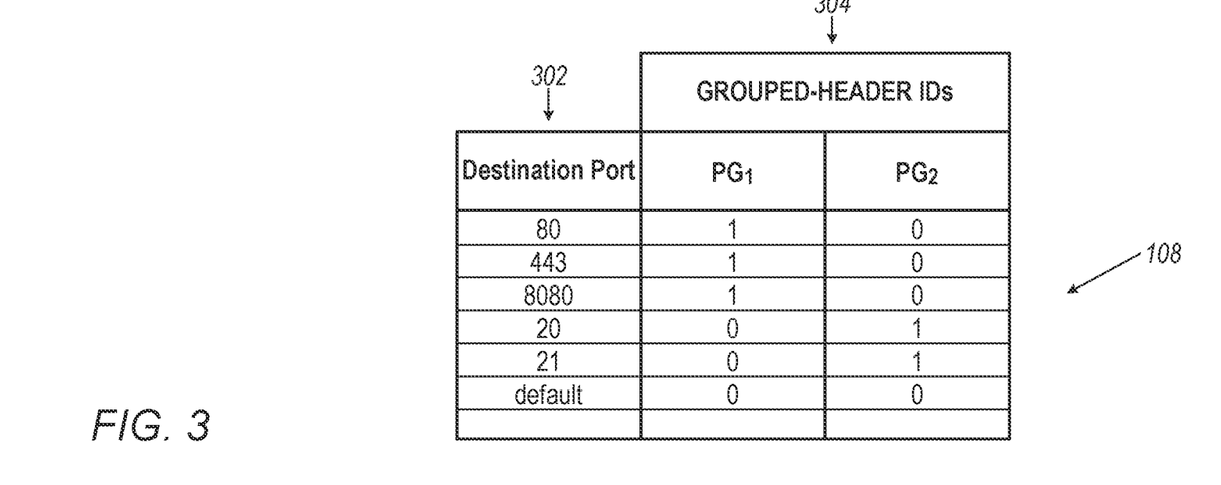
FIG. 3 is a table that schematically illustrates the operation of a group-ID circuit, in accordance with an embodiment of the present invention.

FIG. 3 is a table that schematically illustrates the operation of group-ID circuit 108 (FIG. 1), in accordance with an embodiment of the present invention. The group-ID circuit comprises a destination-port table 302, which comprises possible values of the destination-port header, and a grouped-header-ID table 304, which indicates a group-ID for each of the values in destination-port table 302. In the example embodiment illustrated in FIG. 3, group-ID circuit 108 allocates the group ID=binary 10 to destination-port values in the group {80,443,8080}, and the group ID=binary 01 to destination-port values in the group {20,21}. The group-ID circuit is further configured to assign a group ID=binary 00 to all other destination-port values.

Figure 4:
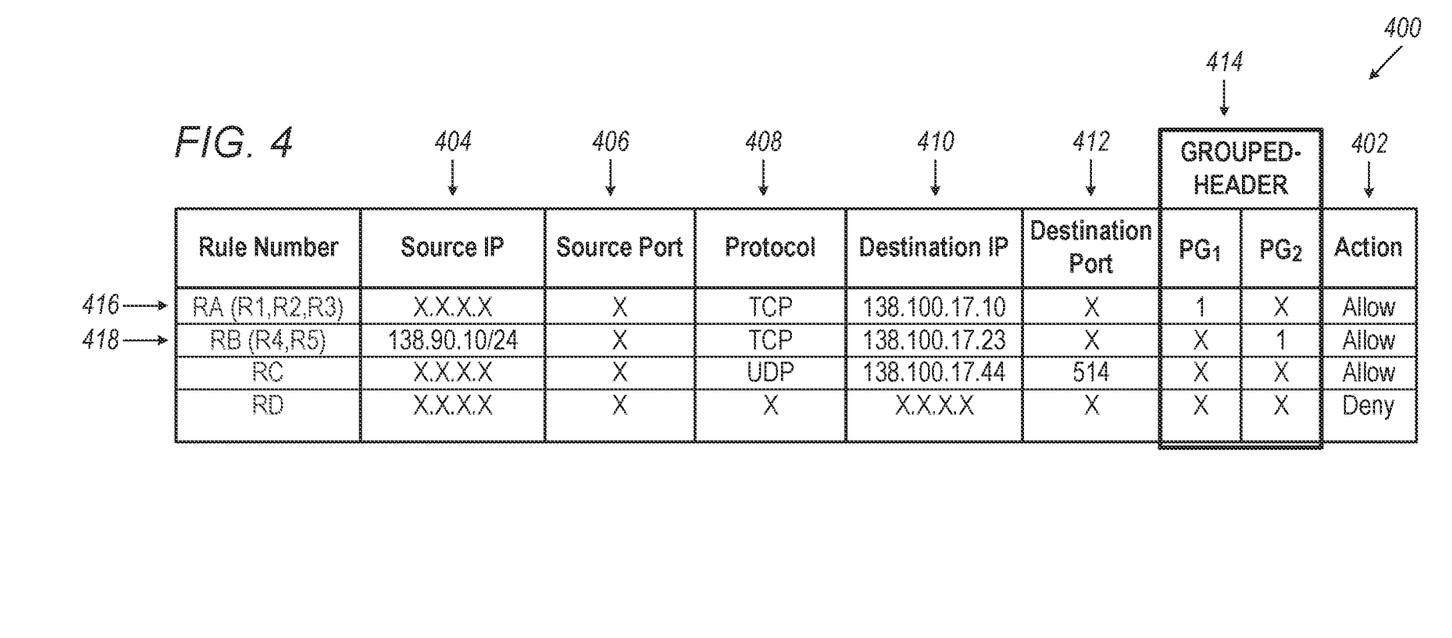
FIG. 4 is a table that schematically illustrates a shorter representation of the ruleset illustrated in FIG. 2, in accordance with an embodiment of the present invention.

FIG. 4 is a table that schematically illustrates a ruleset 400, which is a shortened representation of ruleset 200 (FIG. 2), in accordance with an embodiment of the present invention. Ruleset 400 selects an action from an action set 402 by comparing headers of the packets to source-IP rules 404, source-port rules 406, protocol rules 408, destination-IP rules 410, destination-port rules 412, and grouped-header rules 414, which are invoked by group-ID circuit 108 (FIGS. 1 and 3), responsively to the value in the destination-port header field.

According to the example embodiment illustrated in FIG. 4, each of rules 314 comprises a two-bit group ID, designated PG1 and PG2. Group-ID circuit 108 (FIG. 3) sets PG1=1 and PG0=0 if the destination-port header field value of the packet is one of {80, 443, 808), sets PG1=0 and PG0=1 if this value is one of {20, 31}, and sets PG1=PG0=0 if the destination-port header field value is not in either of the two groups. Thus, the seven rules in table 200 (FIG. 2) can be reduced to four rules in table 400—Rules 1,2,3 of table 200 merge to a rule RA 416 of table 400, and rules R4, R5 merge to a rule RB 418.

It should be noted that the group-IDs in the example embodiment illustrated in FIGS. 3 and 4 are orthogonal (that is—only one of bits PG1, PG0 may be set to logical 1). This allows group overlap when the same grouped header is part of more than one group; however, if many groups are defined, the group-ID field will be large. In alternative embodiments, the group-ID is not orthogonal, and hence may be shorter (e.g., 4 bits for 16 groups, versus 16 bits for orthogonal representation), at the cost of a more complex group-ID circuit, and with the restriction that groups should not overlap.

We will now show how an example sequence of ingress packets is handled by packet processor 102, assuming ASC 110 and Group-ID circuit 108 are configured to the example values illustrated in FIGS. 2, 3 and 4.

Figure 5A:
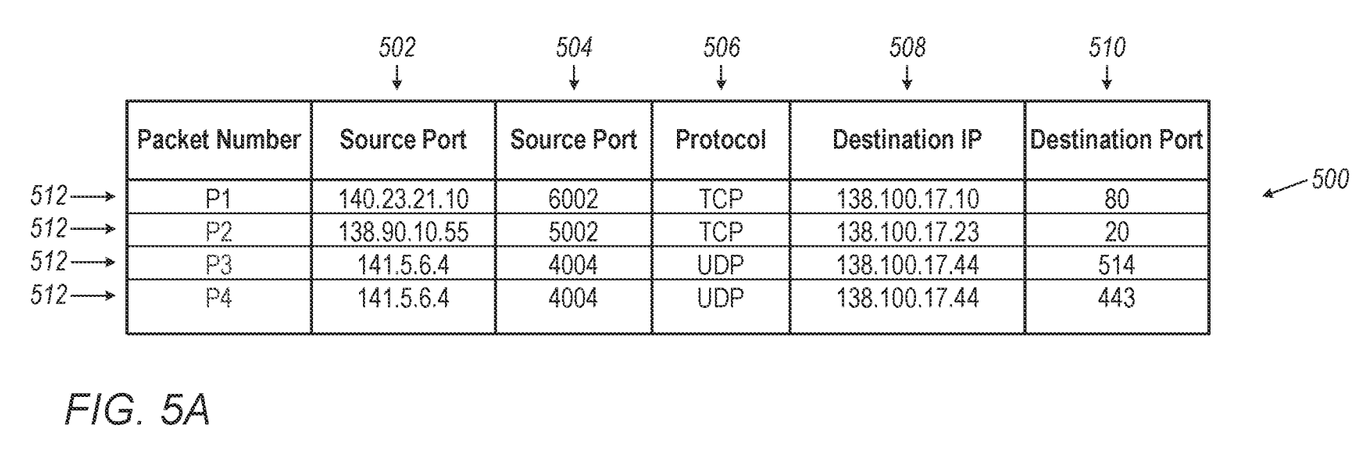
FIG. 5A is a table that schematically illustrates an example sequence of ingress packets, in accordance with an embodiment of the present invention.

FIG. 5A is a table 500 that schematically illustrates an example sequence of ingress packets 512, in accordance with an embodiment of the present invention. The table comprises a source-IP column 502, a source-port column 504, a protocol column 506, a destination-IP column 508 and a destination-port column 510, which specify the values of the corresponding header fields, for packets 512 (designated P1 through P4).

Figure 5B:
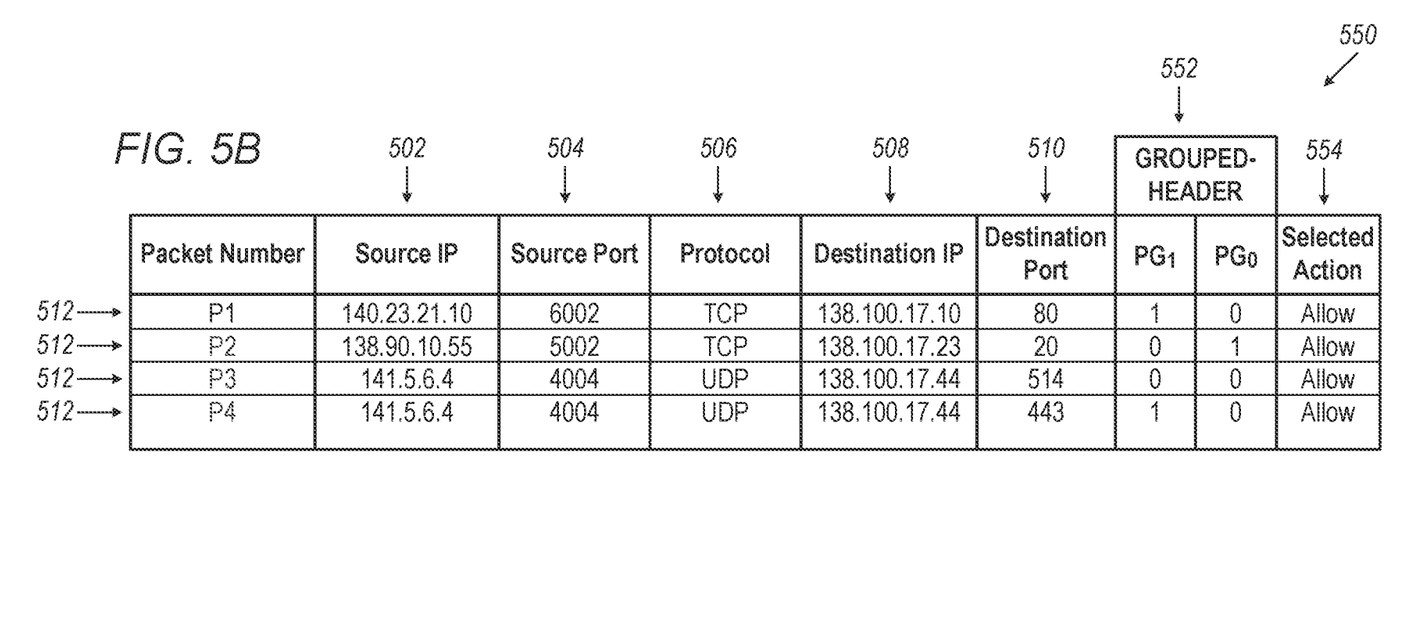
FIG. 5B is a table that schematically illustrates the ingress packets with an added group-ID column and with a selected action, in accordance with an embodiment of the present invention.

FIG. 5B is a table 550 that schematically illustrates ingress packets 512 with an added group-ID column 552 and with selection actions 554, in accordance with an embodiment of the present invention. Column 552 lists the grouped header IDs that grouped-ID circuit 108 generates for each of the packets (see FIG. 3). Action column 554 lists the selected action for each of the packets, according to the ruleset illustrated in FIG. 2.

Figure 6:
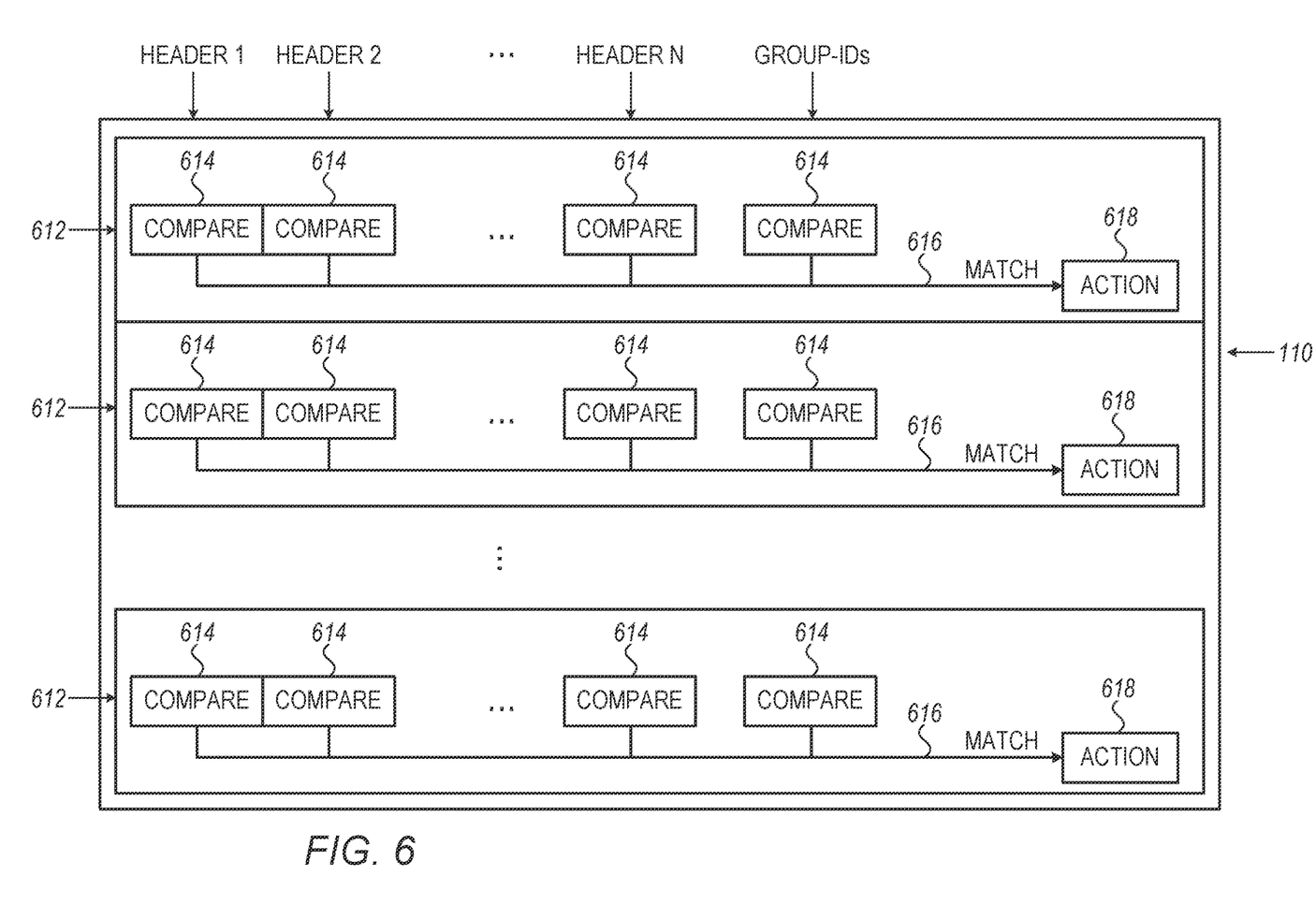
FIG. 6 is a block diagram that schematically illustrates the structure of an Action Select Circuit (ASC), in accordance with an embodiment of the present invention.

FIG. 6 is a block diagram that schematically illustrates the internal structure of ASC 110, in accordance with an embodiment of the present invention. In some embodiments, ASC 110 may comprise a TCAM; in other embodiments, other implementation techniques may be used, including RAM-based implementation, and implementations that include combinations of RAM and TCAM.

ASC 110 receives the contents of the packet headers (e.g., from packet-header registers 105, FIG. 1) and one or more group IDs (e.g., from group-ID circuit 108). The ASC comprises a plurality of rule-rows 612, which compare the headers and the group IDs with prestored expected values, and trigger a corresponding action upon detecting a match.

Each rule-row 612 comprises a plurality of compare circuits 614, to compare the headers and the group-ID inputs to prestored values. The prestored values may include "don't care" fields. If all compare circuits 614 of a rule-row 612 match, a match is indicated on a match line 616. In some embodiments, wired-AND logic is used by compare circuits 614, wherein any compare circuit for which there is no match between the corresponding header (or group-ID value) and the prestored compare-value, pulls the match line low. The match line will be high only all the compare units detect a match. If the match line indicates a match, the rule-row will output the value stored in an action register 618.

In some cases, more than one action may be output when multiple rule-rows 612 indicate a match. In some embodiments ASC 110 outputs only the highest-priority action from all output actions. In an embodiment, the priority of the actions is set according to the physical location of the rule-rows within the integrated circuit.

The structure of ASC 110 described above is cited by way of example. Action-select circuits in accordance with the disclosed techniques are not limited to the implementation described hereinabove. In alternative embodiments, for example, the Action-Select circuit comprises a TCAM which stores the most-frequently used rules, and, when a packet does not fit any of the rules in the TCAM, the action-select circuit searches for an action in a RAM (which typically comprises a larger number of entries). In some embodiments the ASC comprises a random-access memory (RAM) such as a static random-access memory (SRAM), a dynamic random-access memory (DRAM); in yet other embodiments the ASC comprises a combination of one or more SRAMs, DRAMs and/or TCAMs.

Figure 7:
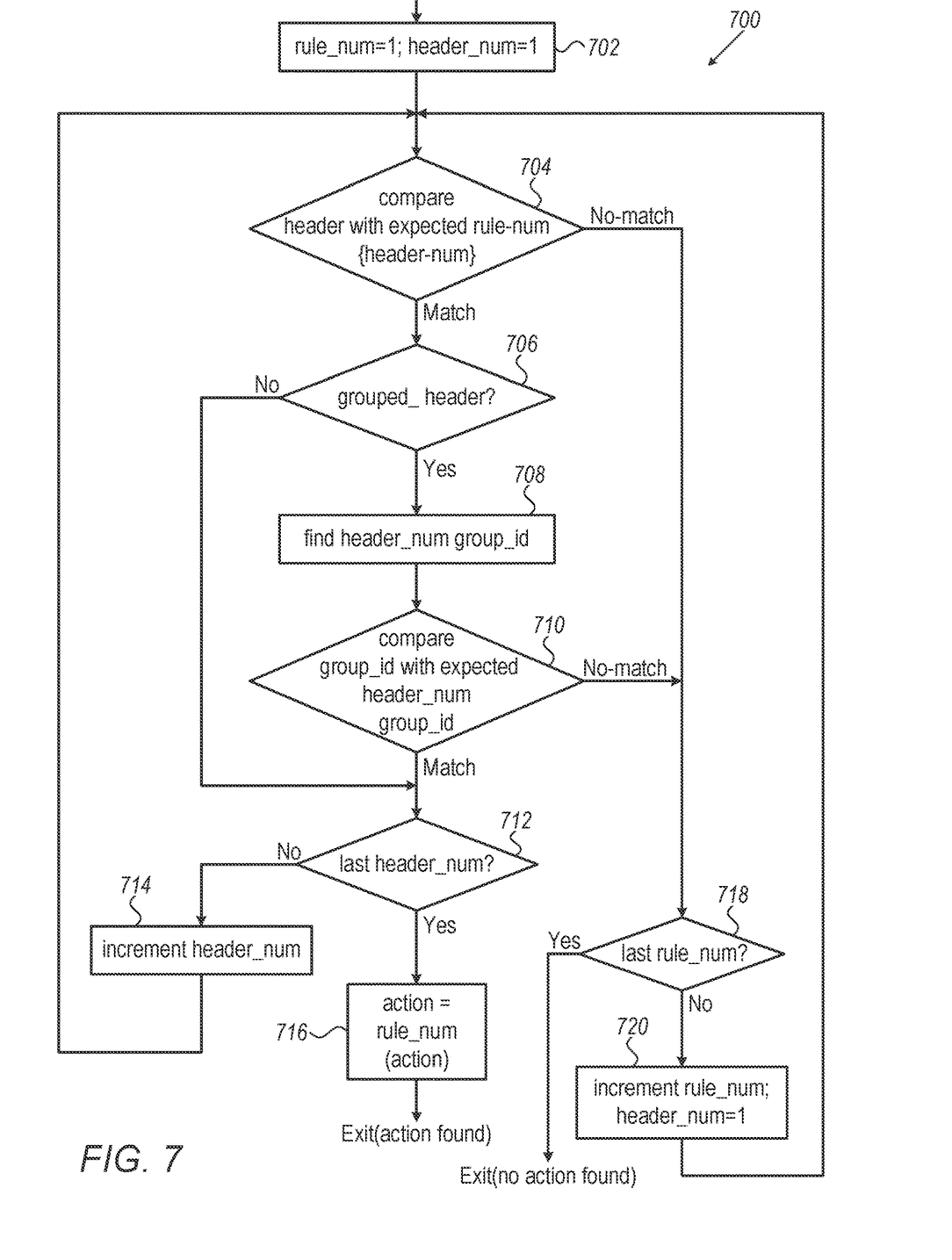
FIG. 7 is a flowchart that schematically illustrates a method for efficient action selection in a packet processor, in accordance with an embodiment of the present invention.

FIG. 7 is a flowchart 700 that schematically illustrates a method for efficient action selection in a packet processor, in accordance with an embodiment of the present invention. The flowchart is executed by ASC 110 (FIG. 1).

We assume that ASC 110 comprises a rule-num variable, which points to the rule being processed, and a header-num variable, which points to the header field being compared.

We will use the notation rule-num{header-num} to indicate the value of the header-num$^{th}$ header field corresponding to the rule-num$^{th}$ rule.

The flowchart starts at an Initialize step 702, wherein the ASC sets the rule-num and the header-num variables to an initial value of 1 (to point to a first header of a first rule). Next, the ASC, in a Compare-Header step 704, compares the expected and the actual values of rule-num{header-num}. If the values match, the ASC proceeds to a Check-Grouped-Header step 706. If the header is a grouped header, the ASC next, in a Find Group-ID step 708, finds a group ID for the grouped-header (e.g., by activating Group-ID Circuit 108, FIG. 1), and then enters a Compare-Group-ID step 710.

In step 710, the ASC compares the group ID that corresponds to rule-num{header-num} to its expected value. If the values match, the comparison associated with the current rule-num{header-num} is successfully completed. This is also the case if the header was not a grouped header, as determined in step 706 (the No output). In both cases, the ASC will enter a check-last-header step 712, and check whether the current header-num points to the last header (e.g., for a 5-tuple, if header-num equals 5). If header-num does not point to the last header, the ASC will, in an Increment Header-num step 714, increment header-num, and then reenter step 704 to process the next header of the current rule.

If, in step 712, header-num is the last header, all comparisons for the current rule (rule-num) have been successfully completed (e.g., match line 616, FIG. 6. indicates a match). The ASC then enters a Set-Action step 716, and selects the action corresponding to rule-num. The flowchart will then end. (We assume that the action priority corresponds to the rule number; hence, if a match is found for rule-num=n, it is not necessary to look for matches at higher rule-num values.)

If, in step 704, one of the headers does not match, or if, in step 710, the group-ID does not match, the checking of the current rule-num may end. The ASC enters a Check-Last-Rule step 718. If the rule is not the last one, the ASC, in an Increment rule-num step 720, increments rule-num and sets header-num=1, and then reenters step 704, to check the next rule. If, in step 718, the current rule-num is the last rule, the flowchart ends, and no action is found.

Thus, according to the example method shown in FIG. 7, ASC 110 may choose an action to be performed by the packet processor on an ingress packet, depending on the header fields of the packet and on a group ID of a grouped header of the packet.

Flowchart 700 illustrated in FIG. 7 and described above is an example that is cited for the sake of conceptual clarity. Other suitable flowcharts may be used in alternative embodiments. For example, in alternative embodiments, some or all the steps of flowchart 700 may be executed concurrently. In some embodiments, more than one action may be allowed, and the flowchart is modified accordingly.

The configuration of network element 102, including ASC 110 and group-ID circuit 108, as well as the structures of tables 200, 400, 500, 550 and the method for action selection in flowchart 700, are example configurations, tables and methods that are shown purely by way of illustration. Any other suitable configurations, tables and methods can be used in alternative embodiments.

In various embodiments, the various action selection and/or group ID selection tasks described hereinabove may be carried out by hardware, by software, or by a combination of hardware and software.

In various embodiments, the different elements of packet processor 102, including action selection and group-ID selection, may be implemented using suitable hardware, such as one or more Application-Specific Integrated Circuits (ASIC) or Field-Programmable Gate Arrays (FPGA), or a combination of ASIC and FPGA.

Packet Processor 102 typically comprises a general-purpose processor, which is programmed in software to carry out at least a part of the packet processing functions. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
one or more ports, to transmit and receive packets over a network; and
a packet processor, to apply a plurality of rules to the packets, at least one of the rules specifying: expected values created as new values based on each header field of a group of header fields of the packets, including, for a given header field in the group, at least a set of multiple expected values, wherein one or more of the expected values for the set are created based on header fields comprising one or more of:
a "do-not-care" indication,
a group ID, and
an action to be applied to the packets, when at least one given header field matches at least one of the expected values of the set.

2. The network element according to claim 1, wherein the expected values for the given header field comprise a "do-not-care" indication.

3. The network element according to claim 1, wherein the packet processor comprises a Ternary Content-Addressable Memory (TCAM) to store the rules, including the group ID.

4. The network element according to claim 1, wherein the packet processor comprises a Random-Access Memory (RAM) and ancillary logic to store the rules, including the group ID.

5. The network element according to claim 1, wherein the given header field specifies a destination port.

6. The network element according to claim 1, wherein the given header field specifies a source port.

7. A method, comprising:
transmitting and receiving packets over a network by a network element; and
applying in the network element a plurality of rules to the packets, at least one of the rules specifying: expected values created as new values based on each header field of a group of header fields of the packets, including, for a given header field in the group, at least a set of multiple expected values, wherein one or more of the expected values for the set are created based on header fields comprising one or more of:
- a "do-not-care" indication,
- a group ID, and
- an action to be applied to the packets, when at least one given header field matches at least one of the expected values of the set.

8. The method according to claim 7, wherein the expected values for the given header field comprise a "do-not-care" indication.

9. The method according to claim 7, wherein applying the rules comprises storing the rules, including the group ID, in a Ternary Content-Addressable Memory (TCAM) in the network element.

10. The method according to claim 7, wherein applying the rules comprises storing the rules, including the group ID, in a Random-Access Memory (RAM) and ancillary logic in the network element.

11. The method according to claim 7, wherein the given header field specifies a destination port.

12. The method according to claim 7, wherein the given header field specifies a source port.

* * * * *